US011427747B2

(12) United States Patent
Cadix et al.

(10) Patent No.: US 11,427,747 B2
(45) Date of Patent: Aug. 30, 2022

(54) SEQUENCED POLYMERS FOR MONITORING THE FILTRATE

(71) Applicant: RHODIA OPERATIONS, Paris (FR)

(72) Inventors: Arnaud Cadix, Saint-Ouen (FR); David James Wilson, Coye la Forêt (FR)

(73) Assignee: RHODIA OPERATIONS, Paris (FR)

( * ) Notice: Subject to any disclaimer, the term of this patent is extended or adjusted under 35 U.S.C. 154(b) by 39 days.

(21) Appl. No.: 17/021,176

(22) Filed: Sep. 15, 2020

(65) Prior Publication Data

US 2020/0407624 A1    Dec. 31, 2020

Related U.S. Application Data

(63) Continuation of application No. 15/564,855, filed as application No. PCT/EP2016/057546 on Apr. 6, 2016, now abandoned.

(30) Foreign Application Priority Data

Apr. 7, 2015  (FR) ...................................... 1500698

(51) Int. Cl.
| | |
|---|---|
| *C04B 24/26* | (2006.01) |
| *C04B 28/02* | (2006.01) |
| *C09K 8/035* | (2006.01) |
| *C09K 8/487* | (2006.01) |
| *C09K 8/508* | (2006.01) |
| *C04B 28/14* | (2006.01) |
| *C08F 293/00* | (2006.01) |
| *C04B 103/00* | (2006.01) |
| *C04B 103/46* | (2006.01) |

(52) U.S. Cl.
CPC ............... *C09K 8/487* (2013.01); *C04B 28/02* (2013.01); *C04B 28/14* (2013.01); *C08F 293/00* (2013.01); *C09K 8/035* (2013.01); *C09K 8/508* (2013.01); *C09K 8/5083* (2013.01); *C04B 2103/006* (2013.01); *C04B 2103/0061* (2013.01); *C04B 2103/46* (2013.01)

(58) Field of Classification Search
CPC .... C08F 293/00; C08F 293/005; C04B 28/02; C04B 28/14; C04B 2103/006; C04B 2103/0061; C04B 2103/46
See application file for complete search history.

(56) References Cited

U.S. PATENT DOCUMENTS

| | | | |
|---|---|---|---|
| 6,017,854 A | 1/2000 | Van Slyke | |
| 2004/0127606 A1 | 7/2004 | Goodwin | |
| 2006/0105919 A1* | 5/2006 | Colaco | C09K 8/584 507/209 |
| 2011/0263749 A1 | 10/2011 | Reichenbach-Klinke et al. | |
| 2015/0353810 A1* | 12/2015 | Kuhlman | E21B 33/14 166/293 |

FOREIGN PATENT DOCUMENTS

| | | |
|---|---|---|
| CN | 101967369 A * | 2/2011 |
| WO | 2004022668 A1 | 3/2004 |
| WO | WO2015150473 A1 * | 10/2015 |

* cited by examiner

Primary Examiner — Irina S Zemel
Assistant Examiner — Jeffrey S Lenihan
(74) Attorney, Agent, or Firm — Osha Bergman Watanabe & Burton LLP

(57) ABSTRACT

The present invention relates to the use of a sequenced polymer as an agent for monitoring the filtrate in a fluid injected under pressure into an oil rock, wherein the fluid comprises solid particles and/or is brought into contact with solid particles within the oil rock after being injected, the polymer comprising at least three blocks, including: at least one first block which is adsorbed, preferably irreversibly, onto at least some of the particles (p); a second block (B) having a composition other than that of the first and a mean molecular weight of more than 10,000 g/mol, and which is soluble in the fluid (F); and at least one third block of type (A) or type (B).

8 Claims, No Drawings

SEQUENCED POLYMERS FOR MONITORING THE FILTRATE

This application is a continuation of U.S. application Ser. No. 15/564,855, filed Oct. 6, 2017, which is a U.S. national phase entry under 35 U.S.C. § 371 of International Application No. PCT/EP2016/057546, filed on Apr. 6, 2016, which claims priority to French Application No. 15 00698, filed on Apr. 7, 2015. The entire contents of these applications are being incorporated herein by this reference.

The present invention relates to the field of oil extraction. More specifically, it relates to agents providing an effect of controlling fluid loss in fluids injected under pressure into subterranean formations.

In the field of oil extraction, numerous stages are carried out by injecting fluids under pressure within subterranean formations. In the present description, the notion of "subterranean formation" is understood in its broadest sense and includes both a rock containing hydrocarbons, in particular oil, and the various rock layers traversed in order to access this oil-bearing rock and to ensure the extraction of the hydrocarbons. Within the meaning of the present description, the notion of "rock" is used to denote any type of constituent material of a solid subterranean formation, whether or not the material constituting it is strictly speaking a rock. Thus, in particular, the expression "oil-bearing rock" is employed here as synonym for "oil-bearing reservoir" and denotes any subterranean formation containing hydrocarbons, in particular oil, whatever the nature of the material containing these hydrocarbons (rock or sand, for example).

Mention may in particular be made, among the fluids injected under pressure into subterranean formations, of the various fluids for completion and workover of the wells, in particular drilling fluids, whether they are used to access the oil-bearing rock or else to drill the reservoir itself (drill-in), or else fracturing fluids, or alternatively completion fluids, control or workover fluids or annular fluids or packer fluids.

A specific case is that of oil cement grouts, which are employed for the cementing of the annulus of oil wells according to a method well-known per se, for example described in Le Forage [Drilling] by J. P Nguyen (Editions Technip 1993). These oil cement grouts are injected under pressure within a metal casing introduced into the drilling hole of the oil wells, then rise again, under the effect of the pressure, via the "annulus" space located between the casing and the drilling hole, and then set and harden in this annulus, thus ensuring the stability of the well during drilling.

Within an oil extraction well, bringing the fluid under pressure into contact with the subterranean formation (which generally exhibits a more or less high porosity, indeed even cracks) induces a "fluid loss" effect: the liquid present in the fluid has a tendency to penetrate into the constituent rock of the subterranean formation, which can damage the well, indeed even harm its integrity. When these fluids employed under pressure contain insoluble compounds (which is very often the case, in particular for oil cement grouts or else drilling or fracturing fluids comprising polymers), the effect of fluid loss at the same time brings about a concentration of the fluid, which can result in an increase in viscosity, which affects the mobility of the fluid.

In the specific case of a cement grout, the fluid loss can in addition result in excessively rapid setting of the cement, before the space of the annulus is cemented, which can, inter alia, weaken the structure of the well and harm its leaktightness.

For further details relating to the effect of fluid loss and its cementing effects, reference may in particular be made to Well Cementing, E. B. Nelson (Elsevier, 1990).

For the purpose of inhibiting the phenomenon of fluid loss, a number of additives have been described which make it possible to limit (indeed even in some cases completely prevent) the escape of the liquid present in the fluid toward the rock with which it comes into contact. These additives, known as "fluid loss control agents", generally make it possible to obtain, in parallel, an effect of control of the migration of gases, namely isolation of the fluid with respect to the gases present in the rock (gases which it is advisable to prevent from penetrating into the fluid, in particular in the case of cement grouts, these gases having a tendency to weaken the cement during setting).

Various fluid loss control agents of the abovementioned type have been provided, which include in particular cellulose derivatives (for example hydroxyethylcellulose) or alternatively AMPS-based copolymers, such as those described, for example, in U.S. Pat. Nos. 4,632,186 or 4,515,635. These additives are not always fully suitable for providing, in practice, effective limitation of fluid loss. In particular, and this is especially the case in the field of oil cement grouts, the presence of other additives can inhibit the effect of the agents employed for providing control of fluid loss. In particular, in the presence of some dispersing agents or set retarders, the abovementioned fluid loss control agents generally experience a deterioration in their properties.

An aim of the present invention is to provide novel fluid loss control agents for fluids injected under pressure into subterranean formations which are well-suited in practice.

To this end, the present invention proposes to use specific copolymers, which are capable of providing a fluid loss control effect when they are employed with particles, with which they combine, it being possible for these particles to be particles present within the subterranean formation; and/or cement particles in the case of a fluid employed in cementing; and/or particles injected within subterranean formations with the copolymers.

More specifically, according to a first aspect, a subject matter of the present invention is the use, as fluid loss control agent in a fluid (F) injected under pressure into a subterranean formation,
where said fluid (F) comprises solid particles (p) and/or is brought into contact with solid particles (p) within the subterranean formation subsequent to its injection, of a block polymer (P) comprising at least three blocks, including:
- at least one first block, referred to as "of type (A)", also denoted below by "short block", with a weight-average molecular weight typically of less than 30 000 g/mol, indeed even 20 000 g/mol or less, which is absorbed, preferably irreversibly, on at least a portion of the particles (p); and
- at least a second block (B), also referred to below as "lona block", with a composition distinct from that of said first block and with a weight-average molecular weight of greater than 5000 g/mol, for example of greater than 10 000 g/mol (this weight-average molecular weight typically but not necessarily being greater than the weight-average molecular weight of the first block), and which is soluble in the fluid (F);
- at least one third block of type (A) or of type (B).

According to a possible embodiment, a block polymer (P) of use according to the invention can be a triblock copolymer of (A)-(B)-(A) or (B)-(A)-(B) type.

It can also be a polymer of star type, comprising chains ("arms" or "branches") bonded together around a central atom or, more generally, a more complex molecular structure acting as "core", to which the branches are covalently bonded.

When it is of star type, the polymer (P) is typically of the following type:
- a star polymer comprising at least one branch of type (A) and at least two branches of type (B); or
- a polymer of star type comprising at least two branches of type (A) and at least one branch of type (B).

According to a particularly advantageous embodiment, a block polymer (P) of use according to the invention can be a copolymer of comb type, with side chains carried by a linear chain (backbone), for example:
- a polymer carrying several side blocks of type (A) on a linear block of type (B), typically corresponding to the following diagrammatic structure:

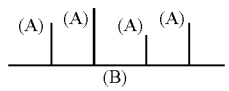

- a polymer carrying several side blocks of type (B) on a linear block of type (A), typically corresponding to the following diagrammatic structure:

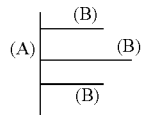

- a polymer carrying several side blocks of type A and B on a linear polymer chain, it being possible or not being possible for said linear polymer chain to comprise (or consist of) one or more block(s) of type (A) and/or one or more block(s) of type (B), which typically corresponds to one of the following diagrammatic structures:

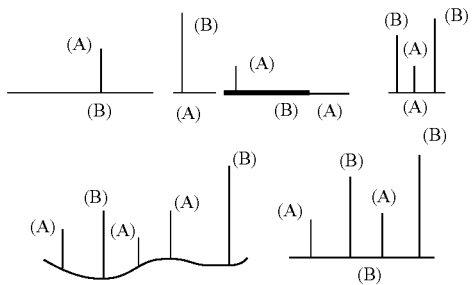

The specific polymers employed in the context of the present invention, due to the presence of the specific blocks of type (A) and (B), turn out to provide a particularly efficient effect of control of the fluid: the presence of the short blocks of type (A) provides anchoring of the polymer to the particles and the presence of the long blocks of type (B), which are large in size and soluble, schematically provides an effect of local increase in the viscosity of the fluid (F) around the particles.

There is thus obtained, at the surface of the particles (p), the formation of a polymer layer based on the long blocks of type (B) anchored to the particles using the blocks of type (A), the particles/polymers combination thus produced forming, so to speak, a "plug" which is sufficiently large at the porosities of the rock, which makes it possible to limit, indeed even to completely block, the phenomenon of fluid loss.

It should be noted that the use of polymers based on long blocks (B) alone would not provide control of fluid loss according to the invention, which requires anchoring of the long blocks of type (B) to the particles (p) via the short blocks of type (A).

In particular, in order for this anchoring to be as effective as possible, it is preferable for the interaction between the short block of type (A) and the particles (p) to be as strong as possible and advantageously for this interaction to be irreversible. Preferably, the short block (A) of a polymer (P) of use according to the invention comprises:
- at least one chemical group forming at least one bond of ionic, covalent or ionocovalent type between polymer and particle;

and/or
- several chemical groups each forming at least one hydrogen and/or Van der Waals bond between polymer and particle, the combination of these bonds together forming an overall bond with a force at least in the range of that of a bond of ionic, covalent or ionocovalent type.

In addition, the strong interactions between particles and polymers make it possible, if need be, to employ the polymer (P) in the presence of additives which are normally harmful to the effectiveness of the fluid loss control agents. In particular, the polymers (P) as employed according to the invention can be employed in the majority of the formulations of fluids intended to be injected into oil-bearing rocks, in particular oil cement grouts comprising additives of dispersant or set retarder type, as well as in drilling fluids and fracturing fluids.

According to a first alternative form of the invention, the injected fluid (F) comprises the polymer (P) but does not comprise solid particles (p), and it encounters said particles (p) within the subterranean formation subsequent to its injection. The association between particles and polymers then takes place in situ. Such a fluid can, for example, be injected during a drilling operation, and the rock cuttings formed during the drilling then perform the role of the particles (p) in situ.

According to a variant alternative form, the injected fluid (F) comprises, before the injection, at least a portion and generally all of the particles (p) combined with the polymer (P), it being understood that it can optionally encounter other particles (p) within the subterranean formation.

Two forms can in particular be envisaged in this context:
- form 1: the polymer (P) and the particles (p) are mixed during the formulation of the fluid (F), on the site of operation or upstream, typically by adding the particles (p), in the dry state or optionally in the dispersed state, to a composition comprising the polymer (P) in solution. According to this alternative form, the fluid (F) can, for example, be an oil cement grout, which is prepared by adding cement powder as particles (p) to an aqueous composition comprising the polymer (P) in solution.
- form 2: the fluid (F) is manufactured, advantageously on the site of operation, from a composition (premix) prepared upstream (hereinafter denoted by the term "blend") comprising the polymer (P) and at least a portion of the particles (p), generally within a dispersing liquid. In order to form the fluid (F), this blend is mixed with the other constituents of the fluid (F).

In the context of these forms 1 and 2, the polymer (P) incidentally exhibits the not insignificant advantage of improving the dispersibility and the suspending of the particles (p). In some embodiments, the polymers (P) combined with the particles (p) can be employed mainly as dispersing and stabilizing agent for the dispersion of the particles (p), at the same time providing an effect of agent for control of fluid loss.

According to another aspect, the subject matter of the present invention is certain specific block polymers which can be used according to the invention, which have been developed by the inventors specifically for this application.

Another subject matter of the invention is the fluids for injection under pressure within an oil-bearing rock or a drilling well comprising these specific block polymers, and also the blends for the preparation of these fluids comprising these polymers in combination with particles (p).

Various specific advantages and embodiments of the invention will now be described in more detail.

The Fluid (F) and the Long Blocks of Type (B)

The term "fluid" is understood to mean, within the meaning of the description, any homogeneous or non-homogeneous medium comprising a liquid or viscous vector which optionally transports a liquid or gelled dispersed phase and/or solid particles, said medium being overall pumpable by means of the devices for injection under pressure used in the application under consideration.

The term "liquid or viscous vector" of the fluid (F) is understood to mean the fluid itself, or else the solvent, in the case where the fluid comprises dissolved compounds, and/or the continuous phase, in the case where the fluid comprises dispersed elements (droplets of liquid or gelled dispersed phase, solid particles, and the like).

The nature of the fluid (F) and of the long block (B) of the polymers (P) used according to the present invention can vary to a fairly large extent, subject to the compatibility of the liquid or viscous vector of the fluid (F) and of the long block (B). In particular, use is made of a long block (B) of hydrophilic nature when the liquid or viscous vector present in the fluid (F) is of hydrophilic nature; conversely, when the liquid or viscous vector of the fluid (F) is hydrophobic, use is made of a long block (B) of hydrophobic nature.

The long blocks of type (B) of the polymers of use according to the invention are specifically soluble in the fluid (F). This is understood to mean that the long block (B), taken in isolation, can be dissolved in the liquid or viscous vector of the fluid (F). Preferably, the long block (B) is soluble at 25° C. and at 1% by weight in the liquid or viscous vector of the fluid (F). The notion of "solubility at 25° C." implies only that it is possible to obtain a more or less viscous, indeed even gelled, solution which, at 25° C., does not result in precipitation. This notion does not exclude the possibility of the dissolution of the block (B) involving prior heating to more than 25° C. in order to obtain this solution. In other words, the notion of "solubility at 25° C." implies the possibility of forming a solution which does not precipitate at 25° C. and not the possibility of forming, at 25° C., a solution which does not precipitate.

Furthermore, it is preferable for the long block (B) to develop the fewest possible interactions, indeed even no interactions at all, with the particles (p). Furthermore, it is preferable for the long block (B) of the polymers (P) of use according to the invention to develop fewer interactions with the particles than the short block (A).

In any case, the blocks of type (A) and the block (B) have distinct compositions within one and the same polymer. This is understood to mean that:

the blocks of type (A) and (B) comprise distinct monomer units;

or at least some of the monomers present on the block (A) are not present on the block (B); and/or at least some of the monomers present on the block (B) are not present on the block (A);

or the block (A) and the block (B) comprise the same monomer units but in distinct proportions.

The long block (B) preferably has a weight-average molecular weight of at least 20 000 g/mol, this weight-average molecular weight preferably being at least 50 000 g/mol, indeed even at least 100 000 g/mol. According to a specific embodiment, the weight-average molecular weight of the long block (B) is greater than or equal to 250 000 g/mol, indeed even greater than or equal to 500 000 g/mol, for example greater than 1 000 000 g/mol.

According to a highly suitable embodiment, the fluid (F) is an aqueous fluid. The term "aqueous" is understood here to mean that the fluid comprises water as liquid or viscous vector, either as sole constituent of the liquid or viscous vector or in combination with other water-soluble solvents.

In the case of the presence of solvents other than water in the liquid or viscous vector of the fluid (F), the water advantageously remains the predominant solvent within the liquid or viscous vector, advantageously present in a proportion of at least 50% by weight, indeed even of at least 75% by weight, with respect to the total weight of the solvents in the liquid or viscous vector.

When the fluid (F) is an aqueous fluid, the block (B) is advantageously a block of hydrophilic nature. The term "block of hydrophilic nature" is understood here to mean a polymer block which, in the isolated state, is soluble in pure water in a proportion of 1% by weight at 25° C. (it being possible for the dissolution to optionally involve heating), forming a more or less viscous, indeed even gelled, solution but without formation of precipitate at 25° C.

Advantageously, the blocks of type (B) of hydrophilic nature employed when the fluid (F) is an aqueous fluid are at least predominantly composed of monomer units selected from the group consisting of the monomer units U1 to U5 defined below, and the mixtures of these monomer units:

monomer units U1: monomer units comprising an acrylamide, in particular dimethylacrylamide (DMA), or else (meth)acrylamide, morpholine N-oxide acrylamide or diacetone acrylamide functional group; the block (B) advantageously comprises monomer units of this type.

monomer units U2: monomer units comprising a sulfonic acid or sulfonate functional group, including in particular the 3-sulfopropyl (meth)acrylate, 2-propene-1-sulfonic acid, sodium 1-allyloxy-2 hydroxypropylsulfonate (COPS1), in particular 2-acrylamido-2-methylpropanesulfonic acid (AMPS), (meth)allyl sulfonate, sodium vinylsulfonate, sodium styrenesulfonate, (3-sulfopropyl)dimethyl(3-methacrylamidopropyl)ammonium, N-(2-methacryloyl-oxyethyl)-N, N-dimethyl-N-(3-sulfopropyl)ammonium betaine or N-(2-1-(3-sulfopropyl)-2-vinylpyridinium betaine units.

monomer units U3: neutral monomer units including, inter alia:

esters of α,β-ethylenically unsaturated mono- or dicarboxylic acids with $C_2$-$C_{30}$ alkanediols or polyethylene glycols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, N-(hydroxymethyl)acrylamide, N-(2-hydroxypropyl)methacrylamide, N-hydroxyethylacrylamide, N-[tris(hydroxymethyl)methacrylamide, 4-acryloylmorpholine, 2-(N-morpholino)ethyl methacrylate, polyethylene glycol meth(acrylate), diethylene glycol (meth)acrylate, ethylene glycol methyl ether (meth)acrylate, 2-hydroxyethyl acrylate, hydroxypropyl acrylate, poly(propylene glycol) acrylate, 2-chloroethyl acrylate, tetrahydrofurfuryl acrylate, vinylacetamide, vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam.

monomer units U4: monomer units carrying ammonium groups, in particular esters of α,β-ethylenically unsaturated mono- or dicarboxylic acids with aminoalcohols, such as N,N-dimethylaminomethyl (meth)acrylate, N,N-dimethylaminoethyl (meth)acrylate, N,N-diethylaminoethyl acrylate, N,N-dimethylaminopropyl (meth)acrylate, N,N-diethylaminopropyl (meth)acrylate and N,N-dimethylaminocyclohexyl (meth)acrylate;

amides of α,β-ethylenically unsaturated mono- or dicarboxylic acids with diamines having at least one primary or secondary amine group, such as N-[2-(dimethylamino)ethyl]acrylamide, N-[2-(dimethylamino)ethyl]methacrylamide, N-[3-(dimethylamino)propyl]acrylamide, N-[3-(dimethylamino)propyl]meth-acrylamide, N-[4-(dimethylamino)butyl]acrylamide, N-[4-(dimethylamino)-butyl]methacrylamide, N-[2-(diethylamino)ethyl]acrylamide, N-[4-(dimethyl-amino)cyclohexyl]acrylamide or N-[4-(dimethylamino)cyclohexyl]meth-acrylamide;

N,N-diallylamines and N,N-diallyl-N-alkylamines, including in particular (3-sulfopropyl)dimethyl(3-methacrylamidopropyl)ammonium, N-(2-methacryloyl-oxyethyl)-N,N-dimethyl-N-(3-sulfopropyl)ammonium betaine, N-(2-1-(3-sulfopropyl)-2-vinylpyridinium betaine and N-(2-1-(3-sulfopropyl)-4-vinylpyridinium betaine.

monomer units U5: acrylate monomer units carrying a COOH or COO— group, including in particular acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid or monoethylenically unsaturated $C_4$-$C_{10}$ and preferably $C_4$ to $C_6$ dicarboxylic acid monoesters, such as monomethyl maleate. According to one possible embodiment, the block (B) of hydrophilic nature employed when the fluid (F) is an aqueous fluid is composed essentially, indeed even exclusively, of monomer units of the abovementioned type, where, in the abovementioned units, the acid groups can be, in all or part, in the free acid form and/or in the salt form, for example potassium, sodium or ammonium salt form (neutralized form).

As employed in the present description, the expression "polymer or polymer block at least predominantly composed of monomer units 'x'" denotes a homopolymer or copolymer (block) resulting from the polymerization of a mixture of monomers, including monomers 'x', this homopolymer or copolymer (block) comprising less than 25 mol %, preferably less than 15 mol % and more advantageously still less than 10 mol % of monomer units other than the units 'x'.

The expression "polymer or polymer block essentially composed of monomer units 'x'" for its part denotes, within the meaning of the present description, a homopolymer or copolymer (block) at least predominantly composed of monomer units 'x' of the abovementioned type, more specifically comprising less than 5 mol %, preferably less than 2 mol % and more advantageously still less than 1 mol % of monomer units other than the units 'x'.

According to a specific embodiment compatible with the preceding embodiments, the block (B) of hydrophilic nature employed when the fluid (F) is an aqueous fluid can comprise hydrophobic monomers in small proportions, typically in a proportion of at least 0.05%, in particularly at least 0.1%, indeed even at least 0.5%, if appropriate; this content of hydrophobic monomers preferably remaining below 10%, for example below 5%, in particular below 3%, indeed even 2%, these percentages being expressed by weight with respect to the total weight of monomer units in the block (B). When hydrophobic monomers of this type are present, they can typically (but nonlimitingly) be chosen from alkyl acrylates (such as methyl acrylate), styrene, alkyl methacrylates and/or vinyl acetate.

The long block (B) present in the polymers employed according to the present invention furthermore has a weight sufficiently great to provide the desired effect of controlling fluid loss. To this end, the block (B) typically has a weight-average molecular weight of greater than 100 000 g/mol, preferably of greater than 150 000 g/mol, for example of greater than 200 000 g/mol, in particular of greater than 250 000 g/mol, this being the case in particular when the block (B) is of one of the abovementioned types. In practice, this weight-average molecular weight generally remains below 3 000 000 g/mol (and typically between 150 000 and 2 000 000 g/mol) but higher weights can be envisaged in the absolute, except in the specific case of a fluid (F) used in the context of a cementing operation, where it is preferable for the weight-average molecular weight of the long block (B) to remain below 1 000 000 g/mol and advantageously below 800 000 g/mol.

In the context of the present invention, it has furthermore been demonstrated that, surprisingly, the desired effect of controlling fluid loss is obtained for blocks (B) having a lower weight-average molecular weight than 100 000 g/mol. Thus, according to a specific embodiment, the block (B) has a weight-average molecular weight of between 10 000 and 100 000 g/mol, preferably of at least 20 000 g/mol, for example of at least 25 000 g/mol, it being possible for this weight-average molecular weight to be typically less than 90 000, for example less than 75 000, indeed even less than 50 000.

An estimation of the weight-average molecular weight of the long block (B) can be measured by size exclusion chromatography and measurement of weight using external calibration with polyethylene oxide standards (relative SEC), which results in a slightly increased value of the weight-average molecular weight denoted in the present description by Mw (relative SEC).

This Mw (relative SEC) is typically measured under the following conditions:

Mobile phase: Mixture of 80% by weight of deionized water, additivated with 0.1M NaNO$_3$, and 20% by weight of acetonitrile Flow rate: 1 ml/min Columns: Shodex OHpak SB 806 MHQ (3×30 cm columns)

Detection: Refractive index (Agilent concentration detector)

Concentration of the samples: approximately 0.5% by weight of solids in the mobile phase Injection: 100 µl Internal reference: ethylene glycol Calibration: polyethylene oxide PEO The Mw (relative SEC) of the long block (B) of the polymers (P) of use according to the invention is generally greater than or equal to 125 000 g/mol, preferably greater than or equal to 150 000 g/mol, this Mw (relative SEC) typically being between 200 000 and 2 500 000 g/mol, in particular between 250 000 and 2 000 000 g/mol. According to a more specific embodiment, it can be less than 125 000 g/mol, for example between 12 500 and 100 000 g/mol.

In the case of a fluid (F) used in the context of a cementing operation, the Mw (relative SEC) of the long block (B) of the polymers (P) is typically (but nonlimitingly) between 25 000 and 900 000 g/mol, for example between 250 000 and 900 000 g/mol.

In practice, the Mw (relative SEC) of the polymer (P) is measured, which, as a result of the low weight of the block (A), also represents a fairly good approximation, inflated, of the weight-average molecular weight of the block (B). The Mw (relative SEC) of the polymer (P) is generally greater than or equal to 15 000 g/mol, and for example greater than or equal to 150 000 g/mol, preferably greater than or equal to 200 000 g/mol, for example greater than or equal to 300 000 g/mol, in particular greater than or equal to 400 000 g/mol, this Mw (relative SEC) of the polymer (P) typically being between 200 000 g/mol and 2 500 000 g/mol, in particular between 250 000 g/mol and 2 000 000 g/mol. It is more particularly between 25 000 and 900 000 g/mol, for example between 250 000 g/mol and 800 000 g/mol, in the case of a fluid (F) used in the context of a cementing operation.

In the Specific Case Where the Fluid (F) Is Used in a Cementing Operation (Oil Cement Grout, Typically):

the block (B) is advantageously a block of hydrophilic nature, preferably comprising units U1 of the abovementioned type, in particular dimethylacrylamide DMA units, optionally but not necessarily in combination with units U2, in particular acrylamidomethylpropanesulfonic acid (AMPS) units, optionally in all or part in the sulfonate form, for example in the form of its sodium salt.

According to a specific embodiment, the block (B) is at least predominantly (for example essentially, indeed even exclusively) composed of a mixture of DMA and AMPS units, with a DMA/AMPS molar ratio for example of between 60/40 and 90/10, in particular between 75/25 and 85/15 and typically of the order of 80/20.

the block (B) typically has a weight-average molecular weight of between 150 000 and 750 000 g/mol, preferably between 200 000 and 700 000 g/mol. Alternatively, the block (B) can have a weight-average molecular weight of between 15 000 and 150 000 g/mol, preferably between 20 000 and 100 000 g/mol.

the block (B) typically has a Mw (relative GPC) of between 200 000 and 800 000 g/mol, preferably between 250 000 and 900 000 g/mol, for example from 300 000 to 600 000 g/mol, the polymer (P) generally having a Mw (relative SEC) within these ranges. The block (B) can alternatively have a Mw (relative GPC) of between 20 000 and 200 000 g/mol, preferably between 25 000 and 180 000 g/mol, for example 30 000 and 150 000 g/mol, the polymer (P) generally having a Mw (relative SEC) within these ranges.

The long block (B) employed when the fluid (F) is an oil cement grout is typically a random DMA/AMPS block with a DMA/AMPS molar ratio between 75/25 and 85/15 (typically of the order of 80/20) and a Mw (GPC-MALS) of between 20 000 and 7500 000, in particular between 200 000 and 750 0000, for example between 400 000 and 600 000.

The Particles (p) and the Short Block (A)

The notion of "particle" within the meaning under which it is employed in the present description is not confined to that of individual particles. It more generally denotes solid entities which can be dispersed within a fluid, in the form of objects (individual particles, aggregates, and the like) for which all the dimensions are less than 5 mm, preferably less than 2 mm, for example less than 1 mm.

The nature of the particles (p) and of the short block (A) of the polymers (P) used according to the present invention can vary to a fairly large extent, provided that the block (A) interacts with the particles (p) and results in an immobilization, preferably irreversible, of the polymer (P) on the surface of the particles (p).

To do this, the block (A) generally comprises monomer units carrying groups which develop, with the particles (p), stronger interactions than the long block (B).

According to a highly suitable embodiment, the particles (p) are inorganic particles introduced within the fluid (F) or with which the fluid (F) comes into contact subsequent to its injection. These particles (p) are then typically cement, calcium carbonate, clay, baryte, silica, sand or carbon black particles. According to this embodiment, the block (A) is preferably at least predominantly (and preferably essentially, indeed even exclusively) composed of monomer units chosen from the preferred groups defined hereinafter, to be adjusted on an individual basis as a function of the nature of the particles (p):

for particles (p) of calcium carbonate or cement:
the block (A) can in particular be at least predominantly (and preferably essentially, indeed even exclusively) composed of:
monomer units U5 of the abovementioned type, advantageously present in the block (A); and/or
monomer units U3 of the abovementioned type; and/or
monomer units U6 carrying phosphate, phosphonate or phosphinate groups (in the free acid form and/or in the saline form), such as, for example, monoacryloyloxyethyl phosphate or bis(2-methacryloyloxyethyl) phosphate units, the monomer units introduced by employing Sipomer PAM 100, 200, 400 or 5000 available from Solvay, vinylphosphonic acid, allylphosphonic acid, isopropylphosphonic acid, diallyl aminomethylene phosphonate and their salts.

The block (B) is then typically at least predominantly (and preferably essentially, indeed even exclusively) composed of units U1 and/or U2 of the abovementioned type.

for Particles (p) of Silica or Sand:
the block (A) can in particular be at least predominantly (and preferably essentially, indeed even exclusively) composed of:
monomer units U3 of the abovementioned type; and/or
monomer units U4 of the abovementioned type; and/or monomer units U7 which are (meth)acrylate units functionalized by polydimethylsiloxanes, such as trimethylsiloxy-terminated PEG 4-5 methacrylate or 3-(trimethoxysilyl)propyl methacrylate.

The block (B) is then typically at least predominantly (and preferably essentially, indeed even exclusively) composed of units U1 and/or U2 and/or U5 of the abovementioned type.

for Particles (p) of Clay:
  the block (A) can in particular be at least predominantly (and preferably essentially, indeed even exclusively) composed of:
    monomer units U4 of the abovementioned type; and/or
    monomer units U6 of the abovementioned type.

The block (B) is then typically at least predominantly (and preferably essentially, indeed even exclusively) composed of units U1 and/or U2 of the abovementioned type.

for Particles (p) of Carbon Black:
  the block (A) can in particular be at least predominantly (and preferably essentially, indeed even exclusively) composed of hydrophobic units U8, including in particular:
    esters of $\alpha,\beta$-ethylenically unsaturated mono- or dicarboxylic acids with $C_1$-$C_{20}$ alcohols, such as, for example, methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate, mono-, di- or tristyrylphenyl (meth)acrylates optionally ethoxylated between the aromatic and methacrylate groups; and/or
    vinylaromatic monomer units, such as styrene, 2-methylstyrene, 4-methylstyrene, 2-(n-butyl)styrene, 4-(n-butyl)styrene or 4-(n-decyl)styrene;
    fluorinated monomer units, such as perfluorinated or highly fluorinated alkyl (meth)acrylates.

The block (B) is then typically at least predominantly (and preferably essentially, indeed even exclusively) composed of units U1 and/or U2 and/or U5 of the abovementioned type.

Whatever its chemical nature, the short block (A) present in the polymers employed according to the present invention generally has a weight-average molecular weight between 500 and 30 000 g/mol, for example between 1000 and 25 000 g/mol, this being the case in particular when the block (A) is of one of the abovementioned types.

According to a particularly advantageous embodiment, employed when the particles (p) are particles of cement or calcium carbonate, the short block (A) is a poly(acrylic acid) homopolymer block with a weight-average molecular weight ranging from 1000 to 20 000 g/mol.

The weight-average molecular weight of the short block (A) can in particular be measured by gel permeation chromatography, followed by a multi-angle light scattering analysis (GPC-MALS).

The Polymers (P)

The polymers of use according to the present invention are specific polymers which comprise at least three blocks, one of which has a very different size from the other two, including a large-sized block (B).

The polymers (P) of triblock or star type can typically be prepared by controlled radical polymerization, which makes it possible to finely control the size of the blocks. The polymers of comb type can also be obtained by controlled radical polymerization or else by postgrafting of polymers, themselves advantageously obtained by controlled radical polymerization, for example under the conditions defined below.

The controlled radical polymerization technique is a technique well known per se which makes it possible, using a control agent for the polymerization, to obtain polymers of controlled weights and in particular block polymers, both the architecture and the size of each of the blocks of which can be controlled.

Controlled radical polymerization processes which are highly suitable for the synthesis of the polymers (P) of use according to the invention are the "RAFT" or "MADIX" processes, which typically employ a reversible addition-fragmentation transfer process employing control agents (also known as reversible transfer agents), for example of xanthate type (compounds carrying —SC=SO— functional groups). Mention may in particular be made, as examples of such processes, of those described in WO 96/30421, WO 98/01478, WO 99/35178, WO 98/58974, WO 00/75207, WO 01/42312, WO 99/35177, WO 99/31144, FR 2 794 464 or WO 02/26836.

These "controlled radical polymerization" processes result, in a well-known way, in the formation of polymer chains which grow substantially all at the same rate, which is reflected by a substantially linear increase in the molecular weights with the conversion and a narrow distribution in the weights, with a number of chains which remains typically substantially fixed throughout the duration of the reaction, which makes it possible to very easily control the mean molar mass of the polymer synthesized (the monomer/control agent initial ratio defines the degree of polymerization obtained for the chains synthesized). The chains obtained furthermore generally exhibit a "living" nature: they exhibit, at the chain end, the reactive group present on the control agent. For this reason, it is possible to continue the polymerization on the polymer chain obtained, while retaining the controlled nature of the polymerization, which can in particular be used to synthesize, at the end of a first polymer block of controlled size, another block with a different composition and also of controlled size.

Triblock polymers (P) of use according to the invention can thus be prepared according to a process comprising the following stages:

(E1) a block (A) or a block (B) of the polymers (P) is synthesized by bringing into contact, in an aqueous medium:
  the ethylenically unsaturated monomers, which are identical or different, chosen for the construction of the block (A)—respectively of the block (B);
  a source of free radicals which is suitable for the polymerization of said monomers; and
  a control agent for the radical polymerization, preferably comprising a thiocarbonylthio —S(C'S)— group;

(E2) a block (B)—or respectively a block (A)—at the end of the block (A)—respectively at the end of the block (B)—formed in stage (E1) is synthesized by bringing into contact:
- the ethylenically unsaturated monomers, which are identical or different, chosen for the construction of the block (B)—respectively of the block (A);
- a source of free radicals which is suitable for the polymerization of said monomers; and
- the polymer obtained on conclusion of stage (E1), which acts as control agent for the radical polymerization and onto which the block (B)—respectively the block (A)—is grafted;

(E3) a block (A)—or respectively a block (B)—at the end of the block (B)—respectively at the end of the block (A)—formed in stage (E2) is synthesized by bringing into contact:
- the ethylenically unsaturated monomers, which are identical or different, chosen for the construction of the block (A)—respectively of the block (B);
- a source of free radicals which is suitable for the polymerization of said monomers; and
- the polymer obtained on conclusion of stage (E2), which acts as control agent for the radical polymerization and onto which the block (A)—respectively the block (B)—is grafted.

In each of stages (E1) to (E3), the size of the polymer block being formed is controlled by the monomer/control agent molar ratio corresponding to the initial amount of monomers with respect to the amount of control agent: schematically, all the chains grow starting from each of the control agents present and the monomers are homogeneously distributed over all the growing chains. For this reason, the monomer/control agent molar ratio dictates the degree of polymerization of the block synthesized in each of the stages and thus makes it possible to define the theoretical number-average molecular weight expected for each of the blocks.

Typically, the monomer/control agent molar ratios in stages (E1) and (E2) are chosen so that:
- The theoretical number-average molecular weight of the block (A) is between 250 and 25 000 g/mol, preferably between 500 and 15 000 g/mol, in particular between 1000 and 10 000 g/mol.
- The theoretical number-average molecular weight of the block (B) is between 70 000 and 5 000 000 g/mol, preferably between 80 000 and 3 000 000 g/mol, in particular between 90 000 and 2 000 000 g/mol. When the polymer is intended for a cementing operation, this theoretical number-average molecular weight of the block (B) is more preferably between 90 000 and 1 000 000 g/mol, advantageously between 100 000 and 500 000 g/mol.

The block (B) can advantageously be prepared in stage (E2) by bringing into contact:
- the ethylenically unsaturated monomers, which are identical or different, chosen for the construction of the block (B);
- a source of free radicals which is suitable for the polymerization of said monomers; and
- the block (A) prepared according to the abovementioned stage (E1), which acts as control agent for the radical polymerization, preferably comprising a thiocarbonylthio —S(C=S)— group and onto which the block (B) is grafted;

with a concentration of monomers within the reaction medium of stage (E) which is sufficiently high to bring about the gelling of the medium if the polymerization were carried out in the absence of the control agent.

This polymerization technique makes it possible to access large-sized blocks (B). Advantageously, the synthesis of the block (B) can be carried out under the polymerization conditions described in the application WO 2012/042167.

Alternatively, when the block (B) is hydrophilic, the block (B) can be synthesized by bringing into contact, within an aqueous medium (M) in which the block (B) formed is not soluble:
- the ethylenically unsaturated monomers, which are identical or different, chosen for the construction of the block (B) and chosen to be soluble in the aqueous medium (M);
- at least one source of free radicals; and
- a reactive stabilizer which comprises:
  - a polymer chain (PC) which is soluble in the medium (M),
  - a group (G) providing the radical polymerization of stage (E) with a living and controlled nature, such as, for example, a group carrying a thiocarbonylthio —S(C=S)— group.

Generally, the conditions to be employed in the abovementioned polymerization stages can be those typically employed in controlled radical polymerizations.

In particular, use may be made, in stage (E) of the process of the invention, of any source of free radicals known per se. For example, one of the following initiators may be concerned:
- hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate,
- azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide) dihydrate,
- redox systems comprising combinations, such as:
- mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
- alkali metal or ammonium persulfates, perborates or perchlorates in combination with an alkali metal bisulfite, such as sodium metabisulfite, and reducing sugars, and
- alkali metal persulfates in combination with an arylphosphinic acid, such as benzenephosphonic acid and the like, and reducing sugars.

In particular in the case of polymerizations carried out in an aqueous medium, use may be made of a radical initiator of redox type, which exhibits the advantage of not requiring heating of the reaction medium (no thermal initiation), which makes it possible to manage even better the exothermicity of the reaction.

Thus, the source of free radicals which is employed can typically be chosen from the redox initiators conventionally used in radical polymerization, typically not requiring heating for their thermal initiation. It is typically a mixture of at least one oxidizing agent with at least one reducing agent.

The oxidizing agent present in the redox system is preferably a water-soluble agent. This oxidizing agent can, for example, be chosen from peroxides, such as:

hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or also potassium bromate.

The reducing agent present in the redox system is also preferably a water-soluble agent. This reducing agent can typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists of), for example, the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of stage (E) to be devoid of copper. In the case of the presence of copper, it is generally desirable to add a copper-complexing agent, such as EDTA.

The nature of the control agent employed in the stages for the synthesis of the blocks (A) and (B) can, for its part, vary to a large extent.

According to an advantageous alternative form, the control agent used is a compound carrying a thiocarbonylthio —S(C=S)— group. According to a specific embodiment, the control agent can carry several thiocarbonylthio groups.

It can optionally be a polymer chain carrying such a group. Thus, the control agent employed in stage (E2) is a living polymer resulting from stage (E1). Likewise, the control agent of stage (E1) can be envisaged as resulting from a preliminary stage (E0) in which the radical polymerization was carried out of a composition comprising:
ethylenically unsaturated monomers;
a control agent for the radical polymerization comprising at least one thiocarbonylthio —S(C=S)— group; and
an initiator of the radical polymerization (source of free radicals).

More generally, a control agent suitable for the synthesis of the polymer (P) of use according to the invention advantageously corresponds to the formula (A) below:

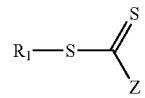

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain.

The $R_1$ or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl allyl, epoxy, alkoxy (—OR), S-alkyl, S-aryl, groups exhibiting a hydrophilic or ionic nature, such as alkali metal salts of carboxylic acids, alkali metal salts of sulfonic acid, polyalkylene oxide (PEO, PPO) chains, cationic substituents (quaternary ammonium salts), R representing an alkyl or aryl group, or a polymer chain.

According to a specific embodiment, $R_1$ is a substituted or unsubstituted, preferably substituted, alkyl group.

The optionally substituted alkyl, acyl, aryl, aralkyl or alkynyl groups generally exhibit from 1 to 20 carbon atoms, preferably from 1 to 12 and more preferably from 1 to 9 carbon atoms. They can be linear or branched. They can also be substituted by oxygen atoms, in particular in the form of esters, sulfur atoms or nitrogen atoms.

Mention may in particular be made, among the alkyl radicals, of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain can result from a radical or ionic polymerization or from a polycondensation.

In the context of the present invention, it is in particular advantageous to employ, as control agents, xanthates, trithiocarbonates, dithiocarbamates or dithiocarbazates.

Use is advantageously made, as control agent, of compounds carrying a xanthate —S(C=S)O— functional group, for example carrying an O-ethyl xanthate functional group of formula —S(C=S)OCH$_2$CH$_3$, such as, for example, O-ethyl S-(1-(methoxycarbonyl)ethyl) xanthate of formula (CH$_3$CH(CO$_2$CH$_3$))S(C=S)OEt.

Another possible control agent in stage (E) is dibenzyl trithiocarbonate of formula PhCH$_2$S(C=S)SCH$_2$Ph (where Ph=phenyl).

The comb polymers according to the invention can typically be obtained by copolymerizing, by the radical route, preferably controlled radical route, ethylenically unsaturated monomers in the presence of macromonomers carrying a block of type (A) or (B), which results in the formation of a monomer chain carrying side blocks of type (A) or (B).

Thus, if it is desired, for example, to synthesize a comb polymer carrying side groups of type (B) on a block of type (A), it is typically possible to bring into contact:
- ethylenically unsaturated monomers $m_A$ appropriate for the construction of a block of type (A);
- reactive polymers (macromonomers) comprising a polymer block of type (B) and an ethylenically unsaturated group;
- a source of free radicals appropriate for the polymerization of said monomers; and
  - preferably, a control agent for the radical polymerization, typically an agent comprising a thiocarbonylthio —S(C=S)— group of the abovementioned type.

In this case, a comb structure is formed, the macromonomers being incorporated in the block of type (A) being formed from the monomers $m_A$ diagrammatically as follows:

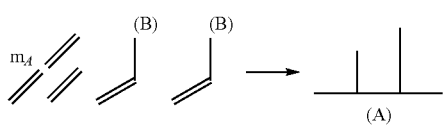

Typically, it is possible to use, according to this embodiment, (meth)acrylic acid monomers as monomer $m_A$ and (methoxy)polyethylene glycol ((M)PEG) macromonomers carried on a (meth)acrylic acid CH$_3$O—(C$_2$H$_4$O)$_n$—OC(O)(CH$_3$)C=CH$_2$, whereby a comb polymer is obtained, the side chains of which are (M)PEGs. Preferably, the weight-average molecular weight of each of these (M)PEG side chains is greater than 5000 g/mol, more preferably greater than 10 000 g/mol (for example between 10 000 g/mol and 50 000 g/mol) and more preferably still greater than 20 000 g/mol.

Likewise, if it is desired, for example, to synthesize a comb polymer carrying side groups of type (A) on a block of type (B), it is typically possible to bring into contact:
- ethylenically unsaturated monomers $m_B$ appropriate for the construction of a block of type (B);
- reactive polymers (macromonomers) comprising a polymer block of type (A) and an ethylenically unsaturated group;
- a source of free radicals appropriate for the polymerization of said monomers; and
- preferably, a control agent for the radical polymerization, typically an agent comprising a thiocarbonylthio —S(C=S)— group of the abovementioned type.

More generally, it is possible to obtain comb polymers carrying a side group of type (A) and/or of type (B) by bringing into contact:
- ethylenically unsaturated monomers (optionally but not necessarily monomers $m_A$ or $m_B$ of the abovementioned type);
- reactive polymers (macromonomers) comprising an ethylenically unsaturated group and, according to the nature of the side groups desired, a polymer block of type (A) and/or a polymer block of type (B);
- a source of free radicals appropriate for the polymerization of said monomers; and
- preferably, a control agent for the radical polymerization, typically an agent comprising a thiocarbonylthio —S(C'S)— group of the abovementioned type.

Alternatively, comb polymers according to the invention can be synthesized by post-grafting polymer chains with grafts carrying blocks of type (A) and/or (B) and a grafting group, according to any method known per se. By way of example, it is possible in particular to carry out the grafting of a polyethylene oxide block to a polyacrylate by reacting a methoxy polyethylene glycol graft with the polyacrylate.

Practical Applications

The polymers of use according to the invention can be employed in virtually all of the fluids used in oil extraction and potentially subject to fluid loss.

According to a specific embodiment of the invention, the fluid (F) is an oil cement grout which comprises the polymer (P) as additive. In this case, the polymer (P), combined with the particles present in the cement, provides the effect of control of fluid loss during the cementing.

According to another embodiment, the fluid (F) is a drilling fluid or a fracturing fluid which comprises the polymer (P) combined with particles (p). The particles (p) are then generally introduced jointly with the polymer into the fluid (F) before the injection of the fluid. The polymer then generally provides stabilization of the dispersion of the particles in the fluid (F) by keeping at least a portion of the particles (p) in suspension in the fluid.

The concentrations of polymer and particles to be employed in these various fluids can be adjusted individually as a function of the application targeted and of the rheology desired.

Various aspects and advantages of the invention will be further illustrated by the example below, in which a polymer was prepared according to the process of the invention.

EXAMPLE

Poly(acrylic acid)-b-poly(N,N-dimethylacrylamide-co-AMPS)-b-poly(acrylic acid) Triblock Copolymer 1.1: Synthesis of a Poly(Acylic Acid) Block Having a Xanthate Ending The synthesis was carried out at the laboratory scale in a glass reactor equipped with a mechanical stirrer, with a system for heating/cooling and for effective regulation of temperature and with a system for reflux/condensation of the vapours.

The composition of initial charges of the reactants and solvents (acrylic acid AA, xanthate, water, ethanol and V50) placed in the reactor is given in table 1.

O-ethyl S-(1-(methoxycarbonyl)ethyl) xanthate (Rhodixan A1) of formula $(CH_3CH(CO_2CH_3))S(C=S)OEt$ was used as MADIX transfer agent. The amount shown in table 1 corresponds to the value of the expected theoretical number-average molecular weight (Mn, th=1 kg/mol), calculated by the ratio of the amount of monomer to the amount of xanthate.

Sparging of the reaction mixture with nitrogen was used throughout the synthesis.

The solution of the monomer in water and the solution of the initiator V-50 (2,2'-azobis(2-methylpropionamidine) dihydrochloride) in water were introduced into the reactor separately in a semicontinuous manner during predetermined periods and while retaining an unvarying temperature of 60° C.+/−2 (see table 1 with charges and reaction conditions).

The general synthesis procedure is as follows:
Solutions of initiator and of the monomer in water are prepared and are placed in feed vessels; subsequently, feed lines to the reactor are filled with these solutions.
Sparging of the reactor with nitrogen is begun. Sparging is maintained throughout the reaction.
The demineralized water, the ethanol, the acrylic acid (first part), the Rhodixan A1 and the initiator V50 (first part) are charged to the reactor.
Stirring is begun at 150 rpm.
The reactor is heated to 60° C.
At a temperature of 60° C.). (+/−2°, cofeeding of the initiator solution semi-continuously with separate feeding of the monomer solution are begun.
Appropriate amounts of the initiator solution (2) are provided at the appropriate passage of time (see table of the reaction conditions for the specific example).
Starting from the same time, appropriate amounts of the monomer solution are provided in the appropriate time (see table 1 below of the reaction conditions).
After the end of the two semicontinuous feeding operations, heating is maintained at 60° C. for 3 hours.
The product is cooled to a temperature <40° C. and the product is discharged for analyses.

According to this procedure, polyacrylic acid functionalized by the xanthate group was synthesized with a number-average molecular weight targeted at 1000 g/mol.

The conversions of monomer and of Rhodixan A1 were determined by $^1$H NMR.

An analysis by size exclusion chromatography in a mixture of water and acetonitrile (80/20) additivated with $NaNO_3$ (0.1N) with an 18-angle MALS detector provided the weight-average molar mass ($M_w$) and polydispersity index ($M_w/M_n$) values given in table 2 below.

TABLE 2

| Block synthesized | $M_n$, th | Xanthate conversion (g) | AA conversion ($^1$H NMR) | $M_w$ (g/mol) | $M_w/M_n$ |
|---|---|---|---|---|---|
| A1 | 1000 | >99.5% | >99.5% | 1800 | 1.4 |

1.2: Synthesis of Triblock Copolymer from the Block A1

1.469 g of solution of the poly(acrylic acid) block having a xanthate ending A1 (as a 35% by weight solution), 9.83 g of 2-acrylamido-2-methylpropanesulfonic acid (AMPS) (50% by weight aqueous solution), 8.50 g of dimethylacrylamide (DMAM) and 255.7 g of demineralized water are introduced into a jacketed glass reactor equipped with a stirrer blade, a bulb condenser and a nitrogen inlet. The pH is adjusted to between 2.0 and 2.5 with 37% by weight hydrochloric acid.

A solution of monomers (solution A) is prepared by weighing respectively 55.68 g of AMPS (50% by weight solution), 48.16 g of DMAM and 63.934 g of demineralized water.

The vessel heel is degassed for 30 minutes and heated to 40° C.

When the reaction medium reaches the temperature of 40° C., 1.34 g of ammonium persulfate (APS) (5% by weight solution) and 0.21 g of sodium formaldehydesulfoxylate (NaFS) (0.25% by weight solution) are added. 167.77 g of the solution A are then introduced into the reaction medium at a flow rate of 1.40 ml/min for 2 h. At the same time, 5.15 g of 0.25% by weight NaFS solution are also added over a period of time of 2 h.

In order to obtain a third PAA block with a targeted number-average molar mass of 1000 g/mol, after reacting for 2 h 30, 0.45 g of acrylic acid is added and the temperature is maintained at 40° C. for 2 h 30.

The conversion of the monomers, studied by $^1$H NMR analysis, shows a quantitative conversion.

1.3: Evaluation of the Triblock Polymer in a Cement Grout

The triblock polymer was used to prepare oil cement grouts having the following formulation:
Municipal water: 335 g
Diblock polymer (at 20% in aqueous solution): 15 g
Dykheroff black label cement (API Class G): 781.5 g

TABLE 1

Conditions of the synthesis of living poly(acrylic acid) block having a xanthate ending

| | Theoretical Mn targeted (g/mol) | Initial charges of the reactants in the reactor | | | | | 38.7% AA solution to introduce semicontinuously | | 10% V50 solution (2) to be introduced semicontinuously | |
|---|---|---|---|---|---|---|---|---|---|---|
| Reference | | Water (grams) | Ethanol (grams) | AA (grams) | Xanthate (grams) | V50 (1) (grams) | in water (grams) | Duration of introduction (minutes) | in water (grams) | Duration of introduction (minutes) |
| A1 | 1000 | 14.5 | 21.7 | 5.0 | 10.4 | 0.11 | 116.3 | 180 | 6.80 | 240 |

The fluid loss control agent is mixed with the liquid additives and with the municipal water before incorporation of the cement.

The formulation and the filtration test were carried out according to the standard of the American Petroleum Institute (API recommended practice for testing well cements, 10B, 2nd edition, April 2013).

After mixing and dispersing all the constituents of the formulation, the grout obtained was conditioned at 88° C. for 20 minutes in an atmospheric consistometer (model 1250 supplied by Chandler Engineering Inc.), prestabilized at this temperature, which makes it possible to simulate the conditions experienced by the cement grout during descent in a well.

The fluid loss control performance was determined by a static filtration at 88° C. in a double-ended cell with a capacity of 175 ml equipped with a 325 mesh×60 mesh metal screen (supplied by Ofite Inc., reference 170-45). The fluid loss volume collected is 27.6 ml, which corresponds to a reasonable API volume of 55 ml.

The invention claimed is:

1. A fluid (F) for injecting under pressure into a subterranean formation, comprising a fluid loss control agent, wherein the fluid loss control agent is a block polymer (P) comprising:
   at least one first block (A); and
   at least one second block (B) with a composition distinct from that of said first block, and with a weight-average molecular weight of greater than 10 000 g/mol, and which is soluble in the fluid (F); and
   at least one third block of type (A) or of type (B);
   wherein the block polymer (P) is a polymer of comb type selected from the group consisting of:
      a polymer carrying several side blocks of type (A) on a linear block of type (B);
      a polymer carrying several side blocks of type (B) on a linear block of type (A); and
      a polymer carrying several side blocks of type (A) and (B) on a linear polymer chain; and
   wherein the blocks (A) and (B) consist of monomer units selected from the group consisting of:
   monomer units U1: monomer units comprising an acrylamide,
   monomer units U2: monomer units comprising a sulfonic acid or sulfonate functional group,
   monomer units U3: neutral monomer units selected from the group consisting of esters of α,β-ethylenically unsaturated mono- or dicarboxylic acids with C2-C30 alkanediols,
   monomer units U4: monomer units carrying ammonium groups,
   monomer units U5: acrylate monomer units carrying a COOH or COO— group,
   monomer units U6: monomer units comprising a phosphate, phosphonate or phosphinate groups, and
   monomer units U7: (meth)acrylate monomer units functionalized by polydimethylsiloxanes.

2. The fluid claimed in claim 1, wherein the fluid (F) is aqueous.

3. The fluid claimed in claim 1, wherein the fluid (F) does not comprise solid particles (p).

4. The fluid claimed in claim 1, wherein the fluid (F) comprises particles (p) combined with the polymer (P), the polymer being employed, in this case, as dispersing and stabilizing agent for the dispersion of the particles (p).

5. The fluid of claim 4, wherein the at least one first block (A) of the polymer (P) is adsorbed on at least a portion of the particles (p).

6. The fluid of claim 5, wherein the at least one first block (A) of the polymer (P) is adsorbed irreversibly on the particles (p).

7. The fluid claimed in claim 1, wherein the fluid (F) is an oil cement grout which comprises the polymer (P) as additive.

8. A process, comprising injecting a fluid (F) according to claim 1 under pressure into a subterranean formation, wherein said fluid (F) comprises solid particles (p) and/or is brought into contact with solid particles (p) within the subterranean formation subsequent to its injection.

* * * * *